United States Patent
Balichard et al.

(10) Patent No.: US 7,172,009 B2
(45) Date of Patent: Feb. 6, 2007

(54) DEVICE FOR DEMOUNTING A TIRE ON A RIM WITH SEATS INCLINED OUTWARDS

(75) Inventors: René Balichard, Sayat (FR); Romuald Gaillardon, Saint-Caprais (FR); Jean-Jacques Drieux, Volvic (FR); David Jardine, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/168,252

(22) Filed: Jun. 28, 2005

(65) Prior Publication Data

US 2006/0000557 A1 Jan. 5, 2006

(30) Foreign Application Priority Data

Jun. 29, 2004 (FR) .................................. 04 07159

(51) Int. Cl.
*B60C 25/05* (2006.01)
(52) U.S. Cl. .................. 157/1.1; 157/1.3; 157/1.33; 157/1.17
(58) Field of Classification Search ............... 157/1.1, 157/1.2, 1.3, 1.33, 1.28, 1.26, 1.17
See application file for complete search history.

(56) References Cited

U.S. PATENT DOCUMENTS

| | | | | |
|---|---|---|---|---|
| 2,712,350 A | * | 7/1955 | Henderson | ............... 157/1.22 |
| 4,133,363 A | * | 1/1979 | Gardner | ............... 157/1.3 |
| 4,491,165 A | * | 1/1985 | Mott | ............... 157/1.33 |
| 5,143,134 A | * | 9/1992 | Tran | ............... 157/1.3 |
| 5,749,982 A | | 5/1998 | Muhlhoff et al. | |
| 5,785,781 A | | 7/1998 | Drieux et al. | |
| 5,787,950 A | | 8/1998 | Muhlhoff et al. | |
| 6,179,032 B1 | * | 1/2001 | Diez | ............... 157/1.1 |
| 6,712,114 B2 | * | 3/2004 | Kliskey | ............... 157/1.3 |
| 6,729,006 B2 | * | 5/2004 | Eynard | ............... 29/426.6 |

FOREIGN PATENT DOCUMENTS

| | | |
|---|---|---|
| DE | 39 10 807 C1 | 5/1990 |
| FR | 2 699 121 | 12/1992 |
| FR | 2 713 557 | 12/1993 |
| FR | 2 713 558 | 12/1993 |
| WO | WO 0078567 A1 | 12/2000 |

* cited by examiner

*Primary Examiner*—Joseph J. Hail, III
*Assistant Examiner*—Robert Scruggs
(74) *Attorney, Agent, or Firm*—Cohen Pontani Lieberman & Pavane LLP

(57) ABSTRACT

A device designed for demounting a tire from a rim at least one of whose seats is inclined outwards, the device being in the form of an insert (4) of length (L) with three faces and whose cross-section in a transverse plane is triangular overall with a contour formed by two long sides (41, 42) and a short side (43), the angle between the long sides being close to the angle between the rim seats and the rotation axis, the length of the short side being essentially equal to the height of the projection of the outward-inclined rim seat, this insert (4) comprising on its face intended to come in contact with a bead seat at least one relief (421, 422) designed to interact with said bead seat (11) so as to keep the insert engaged with the bead.

11 Claims, 2 Drawing Sheets

DEVICE FOR DEMOUNTING A TIRE ON A RIM WITH SEATS INCLINED OUTWARDS

FIELD OF THE INVENTION

The object of the present invention is a device for demounting from its operating rim an assembly consisting on the one hand of a tire with a carcass reinforcement, and on the other hand of a removable support ring, and more particularly an assembly intended for mounting on a one-piece rim at least one of whose seats is inclined outwards.

BACKGROUND OF THE INVENTION

In French patents FR 2 699 121, FR 2 713 557 and FR 2 713 558 there are descriptions of such a rim. When viewed in meridian section (i.e. in a plane containing the rotation axis), this rim has a first seat with two ends, the axially outer end being closer to the rotation axis than is the axially inner end of the same seat (such a seat being said to be "inclined outwards"), a more or less large bearing area designed to receive a removable support ring, perhaps a mounting groove, and a second rim seat, either identical (inclined outwards) or different from the first rim seat (i.e. inclined inwards).

Each outward-inclined rim seat has a part that forms a flange (positioned axially on the inside of said seat) to balance the axial forces due to the internal inflation pressure of a tire mounted on the rim, and a hump or projection of small height (less than the height of the rim flange) to keep the bead of a tire in place on the seat even when the pressure in the tire is low or zero.

This rim, together with a removable support and a tire with a suitable meridian carcass reinforcement profile and beads of geometry appropriate for making contact with the rim seats, forms a rolling assembly that can continue working even when rolling at low or even zero pressure. Here, 'working' means that the tire remains in place on its rim under these particular conditions without coming off the rim (loss of contact between the tire beads and the rim seats) and therefore without risk of losing control of the vehicle equipped with tires of this kind.

Patent EP 1194305 describes a process for demounting such a tire assembly by positioning a demounting insert of triangular section between a bead seat of the tire and a rim seat inclined outwards, the height of said section once in place being close to or greater than the height of the hump (or projection). In this way the bead is brought partly radially outside the hump and can be pushed axially outwards either by a pressure roller acting on the opposite side, or by the action of a lever inserted between said demounting insert and the tire bead.

As stated in that document, the length of the demounting insert must be chosen so as to reconcile at the same time the need to distance the bead radially from its seat so that it can be moved over the hump, and the need not to constrain the bead too much by producing contact pressures between bead and seat that are too large. For that purpose the length must be appropriate (if the length is too large, the excess contact pressure is such that it may become impossible to demount the tire assembly).

It has been found that positioning the demounting insert is a delicate operation requiring sustained attention and possibly needing several attempts, since the insert tends either not to engage in the first place or not to engage over its full length. To position it, a pressure roller is generally used to push one of the beads axially inwards and so make it pivot about its heel (the heel being the part of the bead axially on the inside in contact with a rim flange), so as to produce a space between said bead and the corresponding rim seat. One end of a demounting insert is introduced into that space. Then, by moving the pressure roller over the bead, it is sought to make the entire insert enter between the bead and the rim seat. During this second operation the insert quite often fails to engage correctly and its positioning must then be restarted from the beginning.

The device according to the invention solves this problem.

SUMMARY OF THE INVENTION

To that end a device is proposed, which is designed to demount a tire from a rim having at least one rim inclined outwards, this device being easily positioned and no longer needing almost any effort by an operator throughout the operation of inserting the device.

A device according to the invention is in the form of an insert of length L having three main faces and whose cross-section in a transverse plane is triangular overall, with a contour formed of two long sides and a short side, the angle between the long sides being close to the angle between the rim seats and the rotation axis. The two long sides and the short side correspond to the intersections of the main faces with a transverse cross-section plane. Besides, the length of the short side is essentially equal to the height of the projection or hump of the outward-inclined rim seat. To facilitate mounting, the face of the insert intended to come in contact with a bead seat is provided with at least one relief designed to interact with said bead seat so as to keep the insert engaged with the bead during the phase of positioning the insert between the bead and the rim seat.

'Relief' is understood to mean either a hollow formed on the face of the insert or a form projecting from that face. Of course, the combination of hollows and projections is included in the scope of the invention.

At least one relief is formed on a face of the insert in a continuous way (i.e. extending almost from one end of the insert to the other), or in a discontinuous way (i.e. for example by forming a succession of reliefs in the direction of the insert's largest dimension).

In a variant, at least the face of the insert in contact with the bead has a groove hollowed out along its full width.

In another variant, at least the face of the insert in contact with the bead has at least one groove hollowed out along only part of its width; the advantage of this variant consists in the presence of a localized groove that does not affect the subsequent operation of extracting the bead by sliding it axially over the demounting insert.

Preferably, each groove has the following dimensions:
a depth between 0.2 and 1.0 mm;
a width of at least 2 mm and at most 5 mm.

It has also been found preferable to position the groove longitudinally between the half-width of the face in contact with the bead and the lateral face substantially perpendicular to the rim seat.

If the mounting and removal machine does not have a roller that can exert a sufficient thrust force, it is advantageous to use a mounting lever to dislodge the first bead. In such a situation the demounting insert consists of two sections joined by an intermediate part forming a notch set back relative to the surface of the two sections in contact with the bead. This offset enables a lever to be introduced between the bead and the rim as described in the patent EP 1194305. According to the invention and to facilitate the positioning of the insert, each of the two sections of the insert is provided, on its face intended to be in contact with the bead, with at least one relief to interact with said bead.

The demounting insert can be made of a plastic material such as polyethylene, polyurethane or some other known plastic, in particular such as "ZYTEL®" (6—6 polyamide). It can also be made of an elastomer material with an appropriate Shore A hardness, between 60 and 95.

BRIEF DESCRIPTION OF THE DRAWINGS

The invention is illustrated in a non-limiting way in the drawings attached to the present description, which show various variant embodiments. In the drawings.

DETAILED DESCRIPTION OF THE DRAWINGS

For the sake of clarity, references denoting identical or similar parts are used consistently in all the figures described below.

Figure 1:
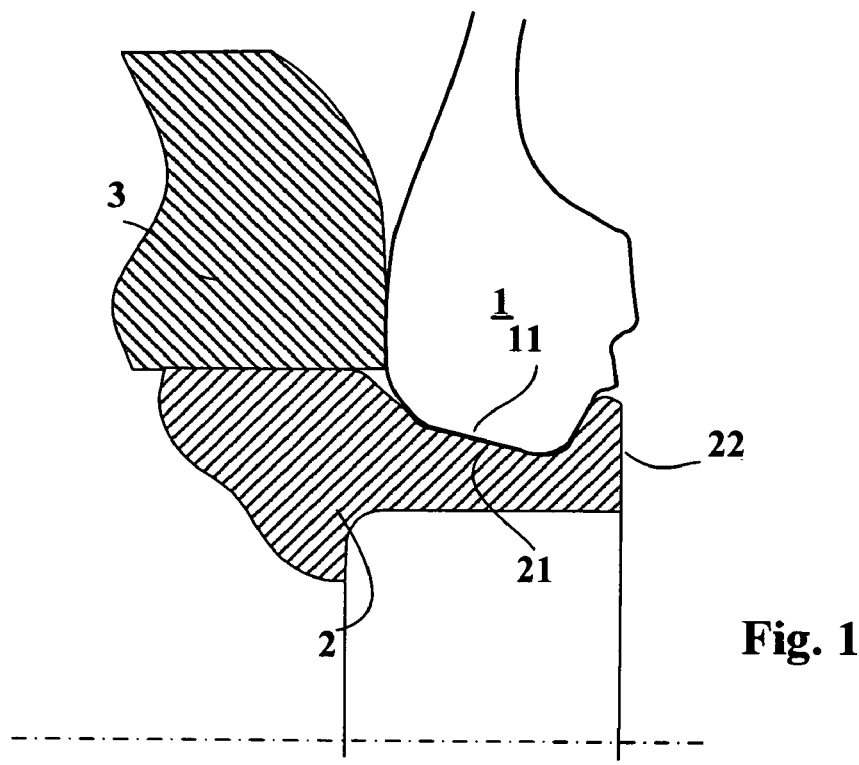
FIG. 1 shows a sectional view of a tire bead in place on a rim seat before the positioning of an insert according to the invention.

FIG. 1 shows a partial view in meridian section (i.e. in a plane containing the tire's rotation axis) of a bead 1 of a tire mounted on a mounting rim 2, the bead having a seat 11 designed to be in contact with a rim seat. The rim 2 has seats 21 at least one of which is inclined outwards (as shown in FIG. 1), i.e. the locus of whose axially outer points is a circle of diameter smaller than the diameter of the circle representing the locus of its axially innermost points. This outward-inclined seat 21 has axially on the outside a projection (or hump) of small height whose function is to keep the bead 1 axially in place when the tire is used at a low inflation pressure or even at zero pressure. The figure also shows a support ring 3 designed to support all or part of the load acting on the tire in the event of pressure loss.

Figure 2:
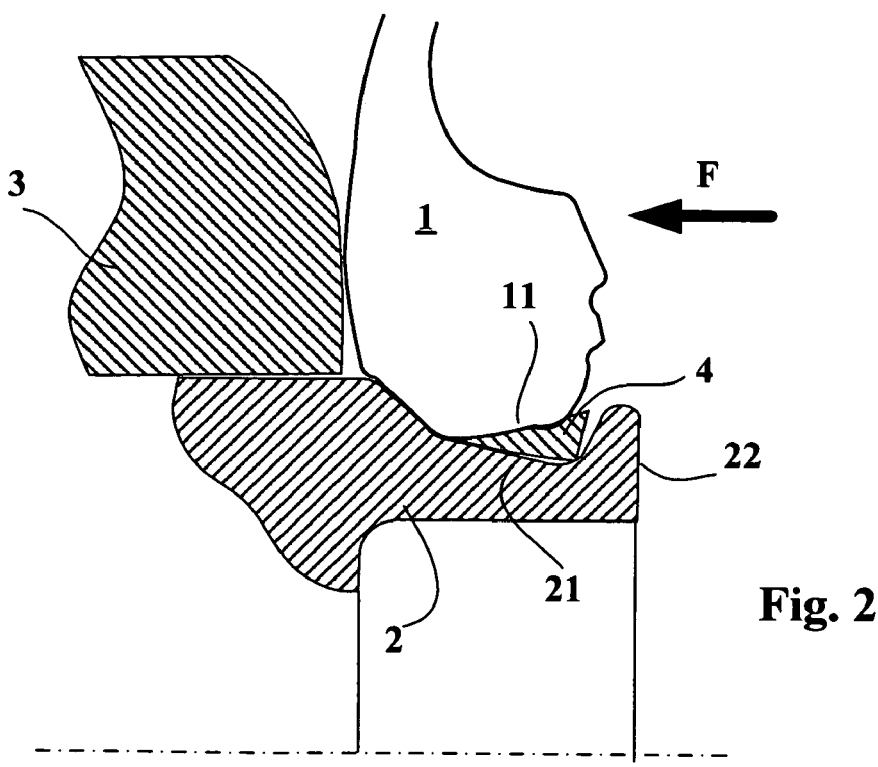
FIG. 2 shows a sectional view of a tire bead in place on a rim seat after the positioning of an insert according to the invention.

To remove the tire from its rim, the bead is made to pivot locally by means of a tool (not shown in FIG. 2) that acts upon one of the tire's sidewalls (an arrow F shows the direction of its action in FIG. 2), and an insert is then positioned which has the shape of an elongated wedge 4 only a cross-section of which can be seen in FIG. 2.

The demounting insert 4, of appropriate length, is interposed between the bead 1 and the rim seat 21. Demounting inserts 330 mm long have been developed for tires whose rim seats are 420 mm in diameter. The same length can of course be used for other seat diameters, such as 460 mm. Other lengths have been tested successfully, namely 380 mm and 420 mm; these demounting inserts of length 380 mm and 420 mm can be used in particular for seats of diameter 420 to 540 mm.

As a reminder, the demounting insert is positioned in two stages: in a first stage one end of the demounting insert is introduced into a space formed between the bead and the rim by the action of a suitable tool that exerts an axial thrust F, and then in a second stage the tool is moved in the circumferential direction while maintaining the thrust so as to move the space between bead and seat circumferentially and progressively introduce the insert along its full length.

The cross-section of the demounting insert is substantially triangular, with two long sides 41, 42, one of these long sides 42 being against the rim seat 21 and the other long side 41 against the seat 11 of the bead 1 (i.e. the part of the bead in contact with the rim seat); the two long sides are joined axially on the outside by a short side 43. The short side 43 is designed to come in contact with the projection 22. The angle between the long sides 41, 42 is close to the angle of inclination of the rim seat relative to the axial direction (i.e. the rotation direction). Besides, the length of the short side 43 is appropriate for facilitating the passage of the bead over said projection.

Once the demounting insert 4 has been positioned completely, an axial thrust is exerted locally on the other sidewall of the tire (not shown) so as to push on the bead 1 in contact with the demounting insert 4 via the intermediary of the internal support ring 3. Owing to its radial eccentricity on the demounting insert 4, the bead 1 can easily be pushed axially outwards, so allowing the complete removal of the tire.

Figure 3A:
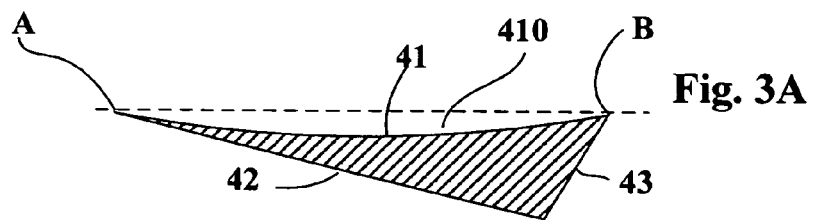
FIG. 3A shows a sectional view of the insert of FIG. 2.

FIG. 3A shows an enlarged cross-section of the demounting insert 4 used in the example illustrated in FIG. 2. In the plane of FIG. 3A the long side 41 intended to be in contact with the seat 11 of the bead 1 has a groove 410 whose width corresponds to the distance separating the end points A and B of said long side 41. The length of the straight segment AB is equal to 11 mm in the example, while the length of the short side is about 5 mm. The shape of the groove in the section plane is that of an arc of a circle.

The maximum curvature (corresponding to the maximum depth of the hollow measured relative to a virtual straight line passing through the points A and B in the figure plane) is preferably larger than 0.2 mm and smaller than 1.0 mm.

This hollow profile is present along the full length of the demounting insert (meaning that each cross-section is of identical or similar shape). Of course, the technical effect can be obtained with an insert whose groove is not continuous in the direction of the insert's largest dimension.

A variant of the demounting insert just described consists in varying the depth of the hollow as a function of the position considered on said insert in the direction of its length.

Figure 3B:
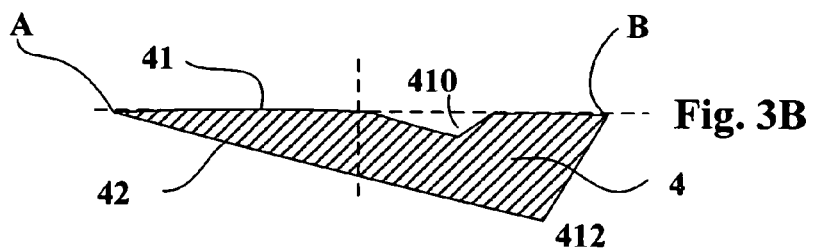
FIGS. 3B, 3C show two other variants of inserts according to the invention.
Figure 3C:
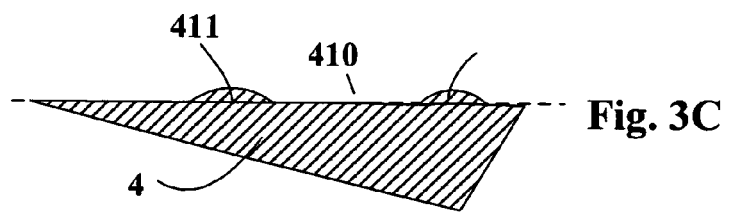

In other variants, such as those shown in FIG. 3B or 3C, the relief on the face of the insert intended to be in contact with the bead seat, viewed in a section plane identical to that of FIG. 2, does not extend the full distance between the ends (A) and (B) of the long side 41, as in the example of FIG. 3A, but is localized.

In particular, FIG. 3B shows a variant which is interesting in the sense that the face intended to be in contact with the bead seat is flat and is provided with a groove 410 which, viewed in cross-section, is localized between the middle of the segment AB joining the ends of the long side and its end B at the intersection with the short side 43. This variant is interesting because it allows easy and effective positioning while preserving a large flat surface in contact with the bead seat, which has the advantage of reducing the axial thrusts that have to be exerted on the beads during the extraction phase.

The groove formed in the demounting insert has a depth of 0.5 mm. It has been shown that a depth up to 1 mm can be satisfactory since this both enables the demounting insert to be positioned effectively, and preserves good mechanical strength of the insert for repeated use. For the same reasons the width of the groove is in this case between 2 and 5 mm while the length of the segment AB is 11 mm.

In the case shown, the groove of FIG. 3B has an asymmetrical profile in the plane of the figure; of course, the same effect can be achieved with a groove whose profile is symmetrical.

In the case shown in FIG. 3B, as in the case shown in FIG. A, the groove is continuous all along the demounting insert; however, the same technical effect can also be obtained with a discontinuous groove. 'Discontinuous' is understood to mean a groove formed of a succession of grooves, or a groove that does not extend along the full length of the face intended to be in contact with a bead.

By discontinuous, one means for example a succession of grooves in the direction of the largest dimension of the demounting insert, or a groove that does not extend over the full length of the insert.

FIG. 3C shows another variant of a demounting insert 41 provided, on its face intended to be in contact with the bead seat, with two protuberances 411, 412 which project on said face, these protuberances together with the space between them forming a groove 410 to co-operate with the bead seat during the introduction of the insert between said bead and the rim seat. The height of the protuberances 411, 412 is essentially equal to the depth of the groove in the preceding examples.

As a variant of this example, it is conceivable for each protuberance to be made as a succession of unconnected protuberances in the direction of the insert's largest dimension (this direction corresponding to the direction along which the insert is introduced between the bead and the rim seat).

Figure 4:
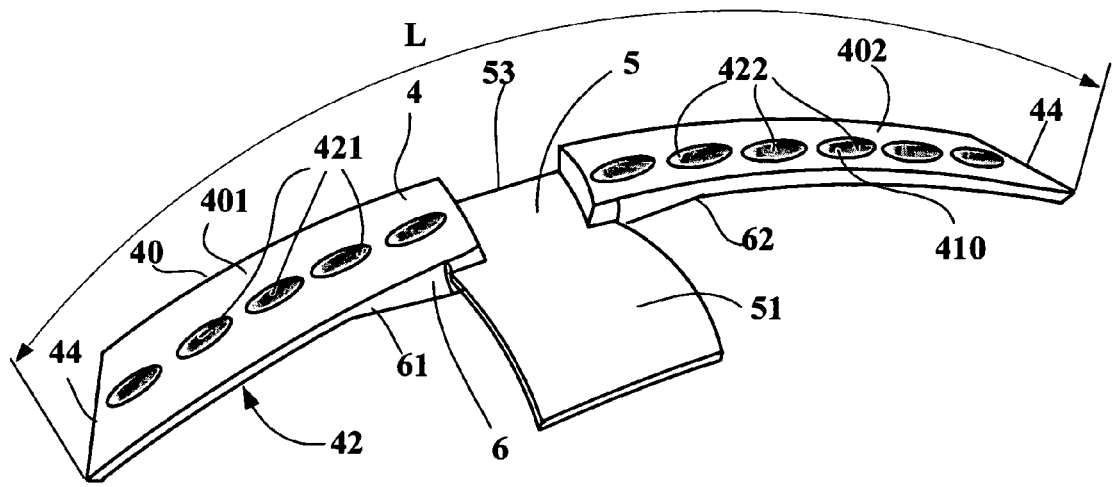
FIG. 4 shows another variant of an insert according to the invention, associated with the use of a removal lever.

FIG. 4 shows a perspective view of another variant of a demounting device, suitable for the case when said demounting requires a tool of the lever or hook type to be inserted between the bead and the rim seat, for the purpose of lifting the bead radially and pulling it axially in order to move it over the projection of the rim and thus to remove the tire from its rim.

In this case, the demounting device is in the form of an insert 4 comprising two half-inserts 401 and 402 joined together by an intermediate portion 5 that has no relief and that co-operates little or not at all with the bead seat for the positioning of said insert. This intermediate portion 5 is set back relative to the faces of the half-inserts designed to be in contact with a bead seat.

Each of the half-inserts 401, 402 has a respective relief, intended to co-operate with the bead seat to facilitate the positioning of the insert. In the present case each half-insert 401, 402 has a plurality of cavities 421, 422 elongated in the direction of the largest dimension of said half-inserts, these cavities being arranged in said direction and essentially in line with one another.

Besides, and to facilitate the introduction of one end of the insert 4 between the bead and the rim, it is advantageous for said end to have a beveled portion 44 whose angle with the direction of the largest dimension L of the insert 4 is between 10° and 70° (by convention, the angle is 90° when there is no bevel). This advantageous arrangement is entirely applicable to the inserts described earlier with reference to FIGS. 3A to 3C. Preferably, the bevel angle is essentially equal to 45°.

The intermediate portion 5 connecting the two half-inserts has a transverse extension 51 which is useful for protecting the projection of the rim against the action of levers. The intermediate portion 5 is offset relative to the face of the insert in contact within the bead seat, this in order to leave a space to enable the introduction of an end of a tool designed to move the bead radially away from the rim and then extract said bead axially over the projection of the rim. As shown in FIG. 4, this intermediate portion 5 has a reinforcement 6 on the face 42 of the insert intended to be in contact with the rim seat to ensure a mechanical joint between the two half-inserts, this reinforcement being in the form of a thickened area that extends onto each of the two half-inserts; the reinforcement 6 has a regular thickness variation near its ends 61 and 62 located on each of the half-inserts 401, 402.

To facilitate the introduction of the lever or hook for removal, it is advisable for the edge 53 of the intermediate portion 5 to be offset towards the inside of the insert relative to the edge 40 along which the long sides 41 and 42 of the half-inserts intersect.

Of course, the variants presented here as illustrations of the invention should not be regarded as limiting and any combination of the characteristics of said variants is part of the present invention. For example, the half-inserts of the last variant (FIG. 4) can be provided with reliefs identical to those of the preceding variants (FIGS. 3A to 3C).

We claim:

1. A device designed for demounting a tire from a rim at least one seat of which is inclined outwards, this seat being provided axially towards the outside with a projection of small height, the device being in the form of an insert of length (L) with three main faces and whose cross-section in a transverse plane is triangular overall with a contour formed by two long sides and a short side, the angle made by the long sides being close to the angle between the rim seats and the rotation axis, the length of the short side being essentially equal to the height of the projection of the outward-inclined rim seat, wherein the face of said insert intended to come in contact with a seat of a bead is provided with at least one relief designed to interact with the bead seat so as to keep the insert engaged between the bead and the rim during the phase of introducing said demounting insert between said bead seat and said rim.

2. The demounting device according to claim 1, wherein the relief consists of a groove extending in the direction of the length of the insert, this groove having a width equal to the distance between the ends (A) and (B) of the long side intended to be in contact with a bead seat.

3. The demounting device according to claim 1, wherein the relief consists of a groove whose width is smaller than the distance between ends (A) and (B) of the long side intended to be in contact with a bead seat.

4. The demounting device according to claim 3, wherein viewed in cross-section, the groove is located between the middle of the long side intended to be in contact with a bead seat and the short side.

5. The demounting device according to claim 3, wherein the groove is formed by two protuberances, said protuberances being in relief on the face intended to be in contact with a bead seat.

6. The demounting device according to claim 1, wherein at least one of the ends of the insert has a beveled portion, the angle between said bevel and the direction of the insert's largest dimension being at least equal to 10° and at most equal to 70°.

7. The demounting device according to claim 6, wherein the angle of the bevel is essentially equal to 45°.

8. The demounting device according to claim 1, wherein the relief provided on the face intended to be in contact with a bead seat is continuous from one end of the insert to the other end.

9. A demounting device comprising two half-inserts, each of the half-inserts being defined according to claim 1, these half-inserts being connected to one another by an intermediate portion, said intermediate portion being set back relative to the faces of the half-inserts intended to be in contact with a bead seat.

10. The demounting device according to claim 9, wherein the intermediate portion is extended transversely by an extension designed to protect the projection of the rim to which said device is fitted, and in that a reinforcement portion is provided to ensure a mechanical connection between the intermediate portion and each half-insert.

11. A device designed for demounting a tire from a rim at least one seat of which is inclined outwards, this seat being provided axially towards the outside with a projection of small height, the device being in the form of an insert of length (L) with three main faces and whose cross-section in a transverse plane is triangular overall with a contour formed by two long sides and a short side, the angle made by the long sides being close to the angle between the rim seats and the rotation axis, the length of the short side being essentially equal to the height of the projection of the outward-inclined rim seat, wherein the face of said insert intended to come in contact with a seat of a bead is provided with at least one relief designed to interact with the bead seat so as to keep the insert engaged between the bead and the rim during the phase of introducing said demounting insert between said bead seat and said rim, wherein the at least one relief is a continuous groove which is located between the middle of the long side intended to be in contact with a bead seat and the short side and wherein at least one of the ends of the insert has a beveled portion, the angle between said bevel and the direction of the insert's largest dimension being at least equal to 10° and at most equal to 70°.

* * * * *